Dec. 6, 1960   D. W. MOLINS ET AL   2,963,026
MANUFACTURE OF MOUTHPIECE CIGARETTES
Filed April 24, 1958
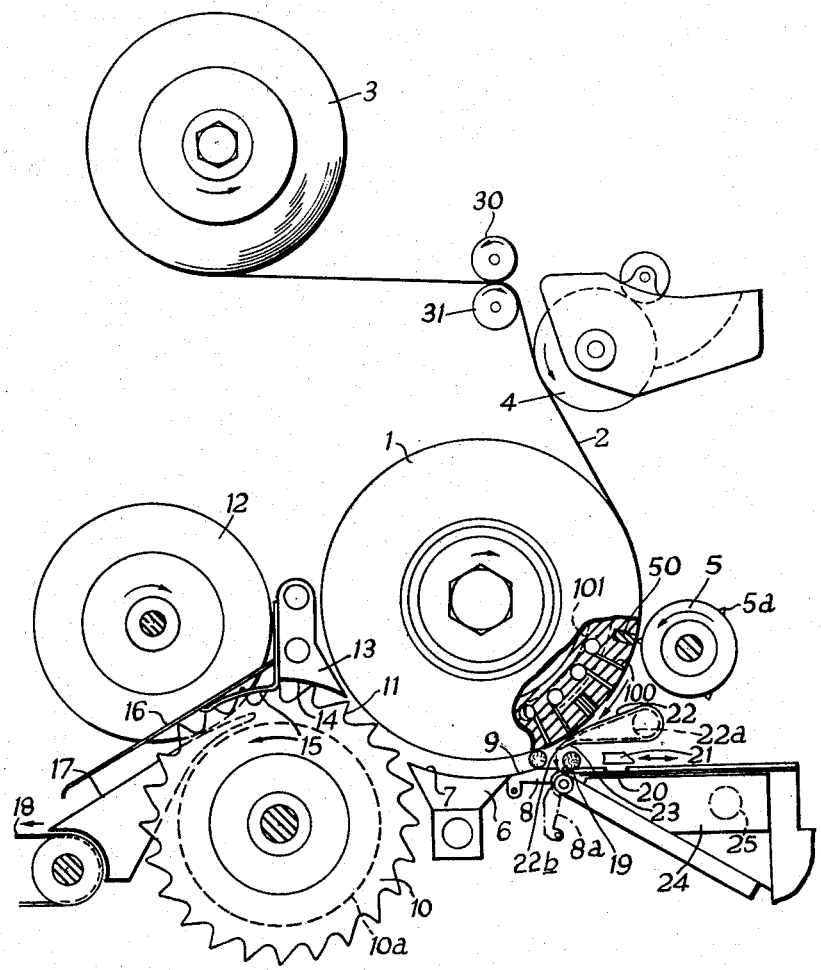
INVENTOR
BY
ATTORNEYS United States Patent Office 2,963,026
Patented Dec. 6, 1960

2,963,026

MANUFACTURE OF MOUTHPIECE CIGARETTES

Desmond Walter Molins and Tom Rowlands, Deptford, London, and Stanley Byrne, Hornchurch, England, assignors to Molins Machine Company Limited, Deptford, London, England, a British company Filed Apr. 24, 1958, Ser. No. 730,663

Claims priority, application Great Britain May 1, 1957

13 Claims. (Cl. 131—94)

This invention concerns improvements in or relating to the manufacture of mouthpiece cigarettes by joining mouthpiece portions and cigarettes to one another by means of adhesive-coated uniting bands. For convenience a mouthpiece portion (which may be a length of filtering material, or a hollow tube, or a length of any other suitable mouthpiece material, or any combination of the foregoing) will be referred to as a "stub." One way of joining cigarettes to stubs is to arrange them end to end in a group, and cause the group to roll along a passage in which an adhesive-coated uniting band is wrapped around the component parts of the group, the rolling being effected by opposed surfaces one of which moves relatively to the other. Such a group may consist of two cigarettes with a stub between them.

According to the present invention there is provided apparatus for making mouthpiece cigarettes, wherein groups, each consisting of at least one cigarette and a stub (e.g. two cigarettes with a stub between them) arranged end to end, are caused to move sideways through a passage defined by opposed surfaces which grip the said groups and move relatively to each other so as to cause each group to roll along the passage in which a uniting band is wrapped around the component parts of the group by the rolling action so as to unite the said parts, and wherein the said apparatus comprises a suction conveyor (e.g. a drum) having a conveying surface which is arranged to convey the said uniting bands and which forms one of the said opposed surfaces, and the apparatus further comprises a support member located beneath the said suction conveyor and having a surface which forms the other of said opposed surfaces and which is opposed to the said conveying surface and supports groups moving through the passage, the arrangement being such that the said uniting bands are fed by the said conveying surface downwardly towards a position at which they are engaged by the said groups in the passage.

The apparatus may comprise web-feeding means to feed a web of material to the said suction conveyor at a controlled speed which is less than the speed of the conveying surface so that the latter slips under the web, and means to cut the web on the conveyor to form uniting bands, whereby the said bands are conveyed by the conveying surface faster than the web and thereby spaced from the latter, the said web and uniting bands being fed to and by the conveyor in such a way that they are maintained above the level of the cigarettes to which the uniting bands are to be applied. The said support member may comprise a stationary surface, and may comprise a displaceable part adapted to be displaced to allow groups to be ejected instead of passing through the passage. The said displaceable part may be located adjacent the entrance to the said passage whereby when the said part is displaced, groups fed towards the passage are not gripped between the said opposed surfaces but fall away. The said displaceable part may be pivoted so as to be displaceable by swinging downwardly.

The apparatus may comprise a reciprocating pusher arranged to push successive groups sideways towards the said passage. There may be provided a pair of opposed elements between which successive groups are pushed towards the said passage, the said elements being arranged simultaneously to engage a group and offer frictional resistance to its sideways movement so as to cause or maintain axial alignment of the component parts of the group before the latter enters the passage.

Means may be provided in the region of the entrance to the passage to discharge air past groups in order to remove dust or loose tobacco fragments therefrom before the groups enter the passage. The said means to discharge air may comprise one of the said opposed elements. Suction means may be provided adjacent the entrance to the passage and arranged to draw away air discharged by the said means to discharge air.

The said means to discharge air may be arranged to discharge air in a direction away from the uniting bands on the said suction conveyor; it may be located above the level of the said groups and arranged to discharge air downwardly, and the said suction means may be located below the level of the said groups and arranged to draw air downwardly.

One of the said opposed elements may be yieldingly mounted, and may be arranged to support a group before the latter is pushed into the said passage.

The apparatus may comprise adhesive-applying means arranged to apply adhesive to the said web as the latter approaches the suction conveyor.

Further according to the invention there is provided apparatus for making mouthpiece cigarettes, wherein groups, each consisting of at least one cigarette and a stub (e.g. two cigarettes with a stub between them) are brought into contact with adhesive-coated uniting bands which are wrapped around them, comprising means to discharge air past the said cigarettes in the groups just prior to their engagement with uniting bands, in order to remove dust or loose tobacco fragments from the said cigarettes. The apparatus may comprise suction means to draw away air discharged by said means to discharge air, and the latter, with the said suction means, may be arranged to direct air past the said groups in a direction away from the said uniting bands.

Apparatus in accordance with the invention will now be described with reference to the accompanying drawing, which shows an end elevation of apparatus by which cigarettes and stubs are united.

A suction conveyor drum 1, provided on its peripheral conveying surface with suction ports 100, is arranged to rotate in the direction shown by the arrow. The ports 100 are arranged to communicate with a fixed suction chamber 101. A web of tipping material 2 is fed by web-feeding rollers 30 and 31 from a reel 3, past an adhesive-applying roller 4, which coats it with adhesive, and on to the surface of the drum 1. The web is gripped by the rollers 30 and 31 and thereby fed at a controlled speed slower than the peripheral speed of the drum 1 so that the drum slips under it. A rotating knife-carrier 5 is provided with knives 5a which cut the web at intervals against hardened insets 50. The portions thus cut from the web (which are to form uniting bands for cigarettes and stubs) are carried forward at the peripheral speed of the drum and thus spaced apart on the drum surface.

A stationary member 6 with a concave surface 7 is fixed beneath the drum 1 so that the surface 7 is opposed to the conveying surface of the drum. A pivoted member 8 has a concave surface 9 which forms an extension of the surface 7 when the member 8 is in its upper position as shown; this member 8 is displaceable and can be swung downwardly to the position 8a when desired. The members 6 and 8 together form a support member for cigarettes and stubs, and the surfaces 7 and 9 together form a counter-surface opposed to the conveying surface of the drum 1 in order to effect rolling of cigarettes and stubs. Thus the surfaces 7 and 9 on the one hand, and the conveying surface of the drum 1 on the other hand, define between them a passage for the cigarettes and stubs.

Beyond the member 6 is a fluted rotatable conveyor wheel 10 provided with flutes 11. The wheel 10 is provided with peripheral slots 10a to receive a disc knife 12 and other elements referred to later. A fixed member 13 with a concave undersurface 14 is arranged above the fluted drum 10. Pairs of spring arms 15 and 16 are fixed to the member 13 and extend across the flutes 11 on both sides of the knife 12, the arms 15 being accommodated in slots 10a. A ramp 17, consisting of two or more suitably spaced plates, whose upper ends are accommodated in peripheral slots 10a in the fluted wheel, extends downwardly to a catcher band 18.

A concave plate 19 is fixed on a spring arm 20 so as to be capable of yielding to downward pressure. This plate provides a conveying and supporting surface over which cigarettes and stubs are moved endwise. The cigarettes and stubs are arranged in groups each consisting of two cigarettes with a double-length stub between them and axially aligned with them end to end. Such groups are fed endwise along the concave plate 19 into the range of a reciprocating pusher 21 which is arranged to move across the plate 19 so as to engage each group in turn and push it towards the left as viewed in the drawing. Preferably the pusher 21 is mounted on a pair of cranks which give it a rotary movement on a horizontal plane.

A member 22 located above the plate 19 has a concave undersurface 23 which cooperates with the yielding concave plate 19 to grip each successive group yieldingly as it is pushed sideways by the pusher 21. The member 22, which is above the level of the groups, is hollow and is connected to a conduit 22a through which air is supplied under pressure; the air is blown downwardly from the chamber inside the member 22 through a downwardly directed nozzle 22b at the left-hand side of the member 22 as viewed in the drawing. This air is drawn down between the plate 19 and the member 8, as shown by the arrow, by a suction device which comprises a suction chamber 24 located beneath the level of the groups and communicating by a pipe 25 with a suitable suction fan or other device.

The apparatus is primarily intended for use in conjunction with a continuous rod cigarette-making machine, from which cigarettes are conveyed endwise with spaces between their ends; suitable stub-feeding means is provided to feed double-length stubs into alternate spaces between cigarettes, thus forming groups each consisting of two cigarettes and an intermediate stub. The component parts of each group are brought into endwise abutment, and the groups are successively pushed sideways by the pusher 21. These operations may be performed by apparatus such as that disclosed in copending application, Serial No. 671,607, filed July 12, 1957.

The operation of the apparatus is as follows.

When the apparatus, and the cigarette-making machine, are started up, the pivoted member 8, which is adjacent the entrance to the rolling passage, is lowered to the position shown at 8a. This is because the first cigarettes produced may not be satisfactory, or for some other reason the groups of cigarettes and stubs deflected sideways by the pusher 21 are unsatisfactory and are to be rejected. These groups will fall past the lowered member 8a into a suitable receptacle and will not be gripped by the opposed surfaces of the passage.

When satisfactory groups are being produced, the member 8 is raised and the surface 9 together with the surface 7 form a countersurface over which the groups are rolled by the conveyor surface of the drum 1.

The web 2 is cut at regular intervals and the cut portions travel forward with the drum, being spaced apart as explained above.

Successive groups are pushed from the plate 19, which yields downwardly to allow the groups to pass, between the plate 19 and the surface 22, which simultaneously engage each group in turn and offer frictional resistance to its sideways movement so as to bring the component parts into correct axial alignment or to maintain such alignment. Each group in turn is pushed in between the drum 1 and the member 8 so as to be gripped therebetween, just in advance of a uniting band which is held by suction on the drum 1. As soon as group reaches the concave surface 9 it starts to roll over the uniting band, thus causing the band to be wrapped around the stub and the adjacent end portions of the two cigarettes and thereby uniting them.

The united group continues to roll until it passes from the surface 7 and falls into a flute 11 of the drum 10, which carries it beneath the member 13 to the knife 12, which cuts through the stub to sever the group in half, thus forming two mouthpiece cigarettes. The group is controlled and prevented from rotating in the flute 11 during cutting by means of the spring members 15 and 16. The mouthpiece cigarettes are stripped from the flute by the ramp 17, down which they roll on to the catcher band 18.

As each group arrives at a position on the plate 19 to be pushed sideways, and is then engaged by the pusher 21 and pushed between the plate 19 and the member 22, air is discharged downwardly, in a direction away from the uniting bands on the drum 1, from the member 22 past and across the group so as to remove from it dust or loose fragments of tobacco before the group enters the passage. The air so discharged, together with dust or tobacco fragments so removed, is drawn away by the suction device comprising the suction chamber 24. Thus the groups are cleaned in the region of the entrance to the passage, just before being gripped between the conveyor surface of the drum 1 and the concave surface 9 of the member 8, and just before their engagement with the adhesive-coated uniting bands.

It will be seen that the web 2 is fed downwardly to the drum 1, which continues its downward movement, and also carries the uniting bands downwardly towards the groups to be united. The adhesive-coated web, and the adhesive-coated uniting bands carried by the drum, are thus always above the level of the cigarettes in the groups to which they are to be applied. In apparatus for assembling cigarettes with stubs there is generally a tendency for tobacco dust and short tobacco particles to fall from the ends of the cigarettes, particularly when groups of cigarettes and stubs are being rolled between opposed surfaces. If the exposed adhesive-coated surfaces of the web of tipping material or the cut-uniting bands are beneath the level of the cigarette there is a risk of tobacco dust and particles falling on these exposed surfaces and adhering to them. Further, if the adhesive which is applied to the web is contained in an open vessel below the level of the cigarettes, tobacco particles may fall into the adhesive itself and be transferred on to the web. As a result, tobacco fragments may be trapped between the uniting bands and the stubs, with detrimental effects on the appearance of the cigarettes. For example they may give a uniting band an uneven surface, or if the uniting bands are white or of a light colour, the tobacco particles may show through as dark markings.

By the arrangement described, it will be seen that the exposed adhesive-coated surfaces are, up to the moment they are wrapped around cigarettes and stubs, out of the range of tobacco particles or dust falling from the cigarettes, and the disadvantage just described is thus avoided or at least greatly reduced.

What we claim as our invention and desire to secure by Letters Patent is:

1. Apparatus for making mouthpiece cigarettes by uniting groups, each consisting of at least one cigarette and a stub arranged end to end, by means of adhesive coated uniting bands, said apparatus comprising a suction drum having a conveying surface, web feeding means to feed a web of adhesive coated material to said conveying surface for conveyance downwardly thereby, means to sever said web on said conveying surface to form separate uniting bands, a stationary support member located wholly beneath said drum and having a concave support surface opposed to said conveying surface and defining therewith a passage, means located wholly below the level of the said conveying surface and of said web feeding means to support groups of cigarettes and stubs for conveyance toward said passage, and means to push successive groups into the passage whereby each group is gripped by the opposed surfaces and caused to roll through the passage in contact with a uniting band and the uniting bands are thereby wrapped around the groups.

2. Apparatus as claimed in claim 1 wherein the said support member comprises a displaceable part adapted to be displaced to allow groups to be ejected instead of passing through the passage.

3. Apparatus as claimed in claim 2, wherein the said displaceable part is located adjacent the entrance to the said passage whereby when the said part is displaced, groups fed towards the passage are not gripped between the said opposed surfaces but fall away.

4. Apparatus as claimed in claim 2, wherein the said displaceable part is pivotally mounted so as to be displaceable by swinging downwardly.

5. Apparatus as claimed in claim 1, comprising a reciprocating pusher arranged to push successive groups sideways towards the said passage.

6. Apparatus as claimed in claim 1, comprising a pair of opposed elements between which successive groups are pushed towards the said passage, the said elements being arranged simultaneously to engage a group and offer frictional resistance to its sideways movement so as to cause or maintain axial alignment of the component parts of the group before the latter enters the passage.

7. Apparatus as claimed in claim 1, comprising means in the region of the entrance to the passage to discharge air past groups in order to remove dust or loose tobacco fragments therefrom before the groups enter the passage.

8. Apparatus as claimed in claim 6, wherein one of the said opposed elements comprises means to discharge air past the groups in order to remove dust or loose fragments of tobacco therefrom before the groups enter the passage.

9. Apparatus as claimed in claim 8, comprising suction means adjacent the entrance to the passage and arranged to draw away air discharged by the said means to discharge air.

10. Apparatus as claimed in claim 7, wherein the said means to discharge air is located above the level of said groups and is arranged to discharge air downwardly in a direction away from the said uniting bands on the said suction conveyor.

11. Apparatus as claimed in claim 9, wherein the said suction means is located below the level of the said groups and arranged to draw air downwardly.

12. Apparatus as claimed in claim 6, wherein one of the said opposed elements is yieldingly mounted.

13. Apparatus as claimed in claim 12, wherein the said yieldingly mounted element is arranged to support a group before the latter is pushed into the said passage.

References Cited in the file of this patent

UNITED STATES PATENTS

| | | |
|---|---|---|
| 1,213,061 | Baldwin | Jan. 16, 1917 |
| 2,158,315 | Wheeler | May 16, 1930 |
| 2,162,424 | Edwards | June 13, 1939 |
| 2,188,998 | Edwards | Feb. 6, 1940 |
| 2,667,877 | Molins | Feb. 20, 1957 |

FOREIGN PATENTS

| | | |
|---|---|---|
| 768,489 | Great Britain | Feb. 20, 1957 |